United States Patent
Arnold et al.

(10) Patent No.: US 12,532,878 B2
(45) Date of Patent: Jan. 27, 2026

(54) TRANSPARENT PANE

(71) Applicant: GLASWERKE ARNOLD GMBH & CO. KG, Remshalden (DE)

(72) Inventors: Hans-Joachim Arnold, Remshalden (DE); Hermann Dehner, Feuchtwangen (DE)

(73) Assignee: GLASWERKE ARNOLD GMBH & CO. KG, Remshalden (DE)

(*) Notice: Subject to any disclaimer, the term of this patent is extended or adjusted under 35 U.S.C. 154(b) by 896 days.

(21) Appl. No.: 16/461,514

(22) PCT Filed: Nov. 8, 2017

(86) PCT No.: PCT/EP2017/078530
§ 371 (c)(1),
(2) Date: May 16, 2019

(87) PCT Pub. No.: WO2018/091320
PCT Pub. Date: May 24, 2018

(65) Prior Publication Data
US 2019/0307116 A1 Oct. 10, 2019

(30) Foreign Application Priority Data
Nov. 16, 2016 (DE) .......... 102016122030.2

(51) Int. Cl.
*A01M 29/06* (2011.01)
*A01M 29/08* (2011.01)
*E04B 1/72* (2006.01)

(52) U.S. Cl.
CPC .......... *A01M 29/08* (2013.01); *A01M 29/06* (2013.01); *E04B 1/72* (2013.01)

(58) Field of Classification Search
CPC .......... A01M 29/06; A01M 29/08; E04B 1/72
USPC .................................................. 43/1; 52/101
See application file for complete search history.

(56) References Cited

U.S. PATENT DOCUMENTS

| | | | | |
|---|---|---|---|---|
| 4,876,121 A * | 10/1989 | Cohen | ........... | A45D 31/00 |
| | | | | 156/289 |
| 5,588,251 A * | 12/1996 | Young | ........... | A01M 29/32 |
| | | | | D20/11 |
| 7,992,361 B2 * | 8/2011 | Thiagarajan | ........... | B29C 65/562 |
| | | | | 52/307 |
| 8,869,480 B2 * | 10/2014 | Klem, Jr. | ........... | A01M 29/06 |
| | | | | 52/311.1 |
| 9,974,298 B2 * | 5/2018 | Arnold | ........... | B23K 26/361 |

(Continued)

FOREIGN PATENT DOCUMENTS

| | | |
|---|---|---|
| DE | 29521460 U1 | 5/1997 |
| DE | 19961506 A1 | 6/2001 |

(Continued)

OTHER PUBLICATIONS

English translation of DE Pat. No. 10346505 to Dederichs, published Jan. 5, 2005.*

(Continued)

*Primary Examiner* — David J Parsley
(74) *Attorney, Agent, or Firm* — Dickinson Wright PLLC

(57) ABSTRACT

A transparent pane comprising a first optically active pattern in a first plane, and a second optically active pattern in a second plane, the second plane being positioned at a distance from the first plane in the direction of thickness of the pane.

2 Claims, 3 Drawing Sheets

(56) References Cited

U.S. PATENT DOCUMENTS

| | | | |
|---|---|---|---|
| 10,286,716 B2* | 5/2019 | Hersch | G02B 3/0018 |
| 2005/0166537 A1* | 8/2005 | Geiger | A01M 29/16 |
| | | | 52/750 |
| 2012/0113519 A1 | 5/2012 | Klem, Jr. | |
| 2013/0087720 A1* | 4/2013 | Cesnik | A01M 29/08 |
| | | | 250/461.1 |
| 2014/0168760 A1 | 6/2014 | Theios | |
| 2015/0205034 A1* | 7/2015 | Facke | G02B 6/0061 |
| | | | 362/606 |

FOREIGN PATENT DOCUMENTS

| | | |
|---|---|---|
| DE | 10161336 A1 | 12/2001 |
| DE | 10346505 A1 | 1/2005 |
| DE | 102011103132 A1 | 11/2012 |
| EP | 1110450 A2 | 6/2001 |
| JP | 07289142 A | 11/1995 |
| JP | 2001-120155 * | 5/2001 |
| WO | 2015127919 A1 | 9/2015 |
| WO | 2015183681 A1 | 12/2015 |

OTHER PUBLICATIONS

Official Communication from the German Patent and Trademark Office for related German Application No. 102016122030.2; dated: Oct. 12, 2017; 7 pages.

* cited by examiner

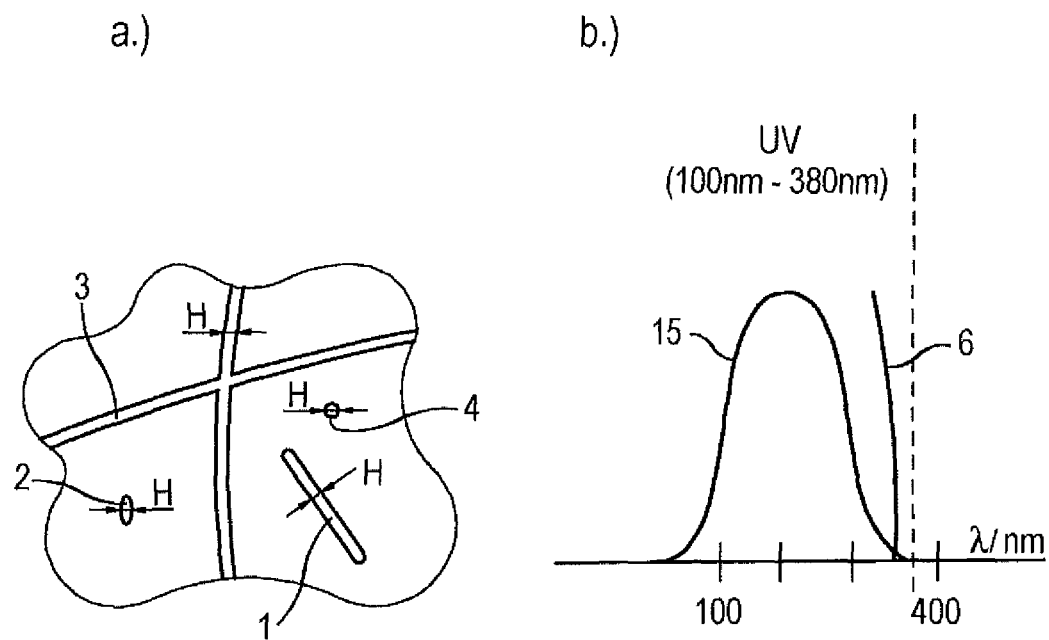
Fig. 1   Prior art from EP 1479294
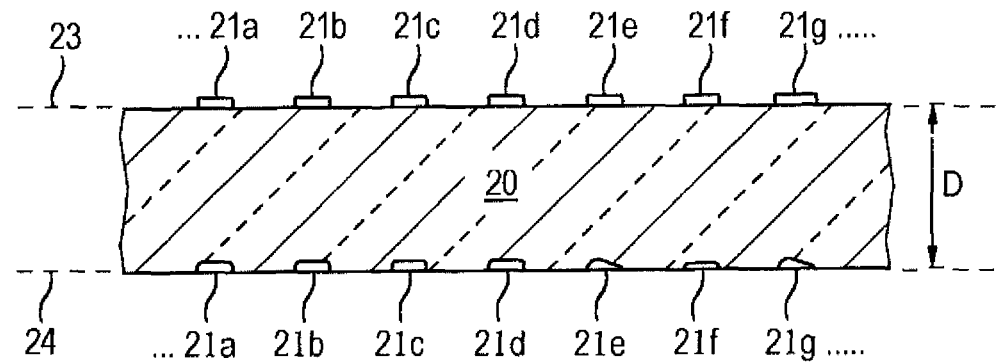
Fig. 2

TRANSPARENT PANE

CROSS-REFERENCES TO RELATED APPLICATIONS

This patent application is a 371 of International Application No. PCT/EP2017/078530, filed Nov. 8, 2017 which claims the priority of German Application No. 102016122030.2, filed Nov. 16, 2016, each of which are incorporated herein by reference in their entirety.

The invention relates to transparent panes, in particular to glass panes, which can be used in building construction, for example, as window glass or generally to close building openings, but also as noise barriers, for example, in road construction or similar.

As is known, such glass surfaces are subject to bird strike. Typical glass panes are not recognized or hardly recognized or recognized too late by birds so that birds fly against glass panes time and again and then frequently at a high speed, which can lead to the death of birds and sometimes even to broken glass panes.

Different techniques are known for avoiding or at least reducing bird strike. Panes to which silhouettes of birds of prey are adhesively applied are frequently seen; these silhouettes should symbolize an obstacle, on the one hand, and should also signal danger, on the other hand. However, such silhouettes have a relatively small effect and additionally represent an interference with a possibly developed aesthetic concept of the construction.

EP 1479294 discloses glass panes with an applied pattern comprising fine patterns, as shown in FIG. 1a. The patterns are so fine that they are not perceived or hardly perceived by humans. However, birds have a higher spatial resolution than humans so that birds can still see them. In this manner, glass panes can be made recognizable as an obstacle without interfering with the possibly planned aesthetic concept of the building.

EP 1479294 also discloses applying a pattern to glass panes comprising UV-active materials, that is materials absorbing and/or reflecting UV light, as shown in FIG. 1b. This makes use of the fact that many bird species can recognize light into the UV range which is no longer visible to humans. Glass panes treated in this manner then have a different appearance than translucent panes for many bird species and are thus recognizable as an obstacle.

It is a disadvantage of the previous techniques that they often represent a compromise between efficiency and pane transparency or that they are not sufficiently effective for all bird species.

It is an object of the invention to provide a transparent pane which has improved bird strike protection.

This object is satisfied by the features of the independent claims. Dependent claims are directed at preferred embodiments of the invention.

A transparent pane has a first optically effective pattern in a first plane and a second optically effective pattern in a second plane spaced apart from the first plane in a thickness direction of the pane.

In other words, the transparent pane can comprise an optically effective pattern having individual pattern regions, with individual pattern regions being spaced apart from one another in the thickness direction of the pane.

Due to the spacing apart of individual pattern elements in the thickness direction of the pane, relative shifts of the pattern elements with respect to one another result which can cause seemingly dynamic effects (scenery effect, Moiré effect) during the approach. In this manner, a cooperation of the patterns results beyond the pattern effect of the individual patterns such that macroscopic patterns are present or are produced or disappear again, which can be markedly dependent on the movement of a bird relative to the pane. The cooperating patterns will thereby have a higher efficiency than the sum of the individual effects so that the protective effect against bird strike is improved.

Two or more optically effective patterns which can be designed matching one another can in particular be present in two or more planes of the pane. The matching can be such that scenery effects are produced and/or are avoided in a desired manner or Moiré effects are brought about. Said planes can be the two surfaces of a pane. However, it is also conceivable to apply individual pattern elements in the interior of a thick pane.

The extended wavelength perceptibility of the birds and/ or the better spatial resolution can be used for the static application of the optically effective patterns. It has furthermore been shown that birds have a good perception for dynamic processes (differential vision). This property can also be used.

Individual embodiments of the invention will be described in the following with reference to the drawings.

FIGS. 1a and 1b show known embodiments;

FIG. 2 shows a first embodiment;

Figure 3:
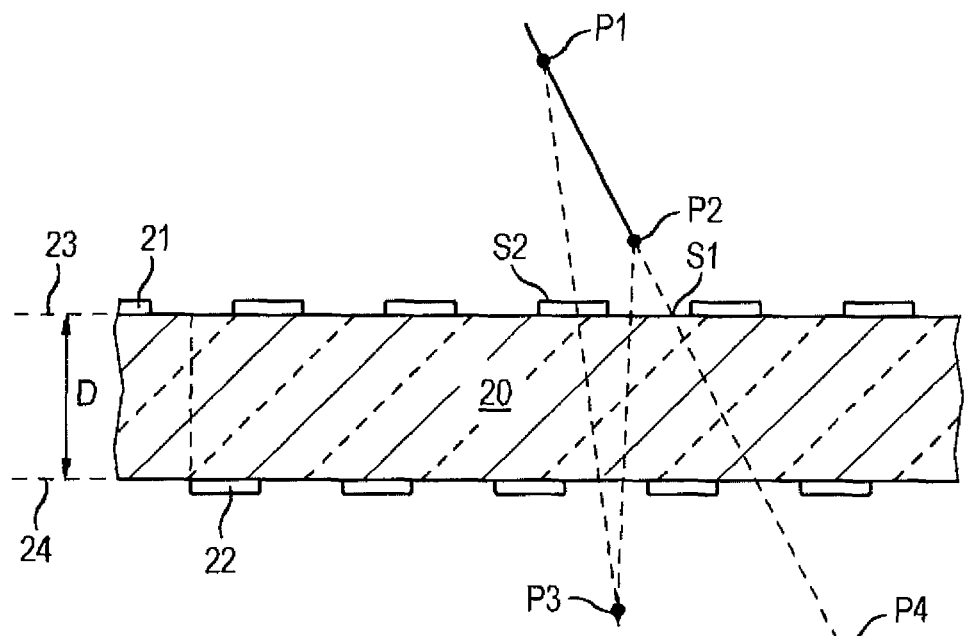
FIG. 3 shows a representation for explaining scenery effects or Moiré effects.

In the present description and in the claims, features should also be considered combinable with one another, even if this combination is not explicitly addressed, if the combination is technically sensible. A feature which is described in a specific context should also be deemed to be disclosed as usable separately from this context provided that this separate use is technically possible. Descriptions of methods and method steps should also be considered as a description of apparatus and subjects which the methods and method steps implement and vice versa.

FIG. 2 shows a pane 20. It can be a transparent pane, for example, of glass, quartz glass, plastic or similar. The pane has two surfaces which are disposed at the top and at the bottom respectively in FIG. 2 and which have a spacing D assumed to be constant in the drawing. The spacing D can, but does not have to be constant. Two planes which are disposed on the two pane surfaces in the embodiment of FIG. 2 are indicated by the dashed lines 23 and 24. Each of the surfaces corresponding to each of the planes 23, 34 has an optically effective pattern 21, 22 which can comprise respective individual pattern elements 21a, 21b, 21c, 21d, . . . and 22a, 22b, 22c, 22d, . . . . The pattern elements can be present separately from one another as patterns of individual dots and/or can comprise contiguous line-like pattern elements. The lines can be open or closed lines (circles, ellipses, squares, irregularly closed shapes). The lines can be straight, angular/angled or curved.

FIG. 2 shows an embodiment in which the pattern 21 was produced by the application of a specific material corresponding to desired pattern elements onto the pane surface corresponding to the plane 23. It can have titanium oxide (e.g. $TiO_2$) and/or zinc oxide (e.g. $SnO_2$). The layer thickness can be selected such that a desired amount of reflection and/or absorption and/or scattering is produced at specific light wavelengths or ranges (UV range). The pattern 22 shows an embodiment in which the pattern elements were produced by a removal from the plane or by a processing of material points in the plane 24. The individual patterns can be produced in this manner, with mixed forms of the production also being possible. The individual pattern elements can be sharply delineated against the environment (other pattern elements) or can have gradual transitions with respect thereto.

Without referring to the two planes 23 and 24, the individual pattern elements 21*a*, 21*b*, . . . , 22*a*, 22*b*, . . . can also be described as pattern elements of an optically effective overall pattern which have a specific spacing D from one another in the pane direction.

Unlike as is shown in FIG. 2, the pattern elements 21*a*, 21*b*, . . . , 22*a*, 22*b*, . . . can also be disposed in the interior of the pane volume and can be produced there by suitable processing steps, for instance by laser focusing and similar. They can e.g. effect an increased light scattering.

A pattern can be an arrangement of pattern elements having different optical properties. The optical properties can be transmission and/or absorption and/or reflection and/or scattering and/or influencing of the polarization. A respective plurality of pattern elements are preferably provided in this respect which each have one of at least two different qualities. The one, first quality can in this respect be that one of the more or less untreated transparent pane material, whereas the second quality can be significant modification.

The modification can take place by a material change and/or by a coating, a vaporization, an adhesive application, an implantation, a surface processing, a chemical processing or similar. However, both qualities can also be modified as mentioned with respect to the transparent pane material, with the modifications of the two qualities with respect to one another then differing in quality and/or quantity.

Pattern elements of the first quality can look like regularly transparent (translucent) material, in particular glass, in the range of the spectrum visible to humans (lower limit 380 nm or 400 nm wavelength, upper limit 800 nm or 780 nm wavelength) of the pane region; in particular in this wavelength range they can therefore absorb up to at most 20% or at most 10% and only slightly (<10% or <5% or less than 2%) reflect and scatter the radiation power. This can also be the case beyond the visible range (UV, IR). Here, this can refer to regular, untreated and uncoated pane ranges.

The second quality differs from the first in absorption and/or reflection and/or transmission and/or scattering and/or influencing of polarization. The second quality can in particular comprise a more pronounced influencing, in particular absorption and/or reflection and/or scattering, of a specific wavelength or of a specific wavelength range. The absorption and/or reflection and/or scattering can each per se or combined influence, that is absorb and/or scatter and/or reflect, over 20% or over 50% or over 70% of the radiation power of a specific wavelength or of a wavelength range.

The influenced wavelength range or the influenced wavelength can be in the range visible to humans and can influence parts thereof or more or less the entire range. The influenced wavelength range or the influenced wavelength can also be in the adjacent ultraviolet range, in particular with a lower limit of 50 nm or 100 nm or 300 nm and an upper limit of 400 nm or 380 nm. The absorption and/or the reflection and/or the scattering can in particular be greater here than with the first quality.

The different pane regions of the first and second qualities can be sharply delineated with respect to one another or can have gradual transitions.

The pane regions of the second quality preferably take up less than 60% or less than 55% of the pane surface and/or at least 10% or at least 20% or at least 45% of the pane surface.

Each of the patterns can at least regionally be regularly periodically applied in one dimension or in both area dimensions. However, it can also be designed in a random manner or in a pseudorandom manner. If one pattern (e.g. pattern 21) is designed in a pseudorandom manner (or only seemingly in a random manner, but actually in a deterministic manner), the other pattern (then 22) can, in coordination therewith, be designed in a pseudorandom manner.

The pattern elements of the second quality (in particular therefore having a regionally higher absorption and/or reflection, scattering) can be isolated from one another in in island-like manner and, as separate regions, can be disposed in more or less contiguous pane regions of the first quality. However, the relationships can also be reversed.

Effects of the described patterns are explained with reference to FIG. 3. It is assumed that a bird flies from the position P1 to the position P2. Positions P3 and P4 are in this respect viewed in a space behind the pane, with P3 being disposed obliquely at the front in the direction of flight and P4 being disposed exactly at the front in the direction of flight.

The situation is assumed in FIG. 3 that the points S1 on the closer plane 23 which are disposed at the front in the direction of flight and the corresponding point on the other plane do not have a covering pattern element such that, overall, from the positions P1 and P2, the pane point S1 appears translucent overall and the spatial volume P4 behind it is and remains visible.

A different assumption is made for the pane point S2. From the position P1, a covering pattern is present in the closer plane 23 such that the point S2 appears opaque and the spatial volume P3 behind it is not visible. The situation from position P2 is different. Both planes 23 and 24 are translucent in the conventional sense of the word (low-absorbing, more transparent) such that the pane point S2 is translucent overall and the volume P3 behind it becomes visible. In this manner, the translucence of the pane point S2 changes during the movement from point P1 to point P2. This can also be understood as a scenery effect. With larger patterns, a Moiré effect, that is a large pattern, results overall which is produced by the superposition of at least two small patterns (pattern 21 and 22).

The description just focused on intensity-absorbing patterns. Instead or in addition, the pattern can also be scattering and/or reflective. Instead of opaque regions, darker or more blurred or reflective regions can then arise.

Figures 4A, 4B, 4C:
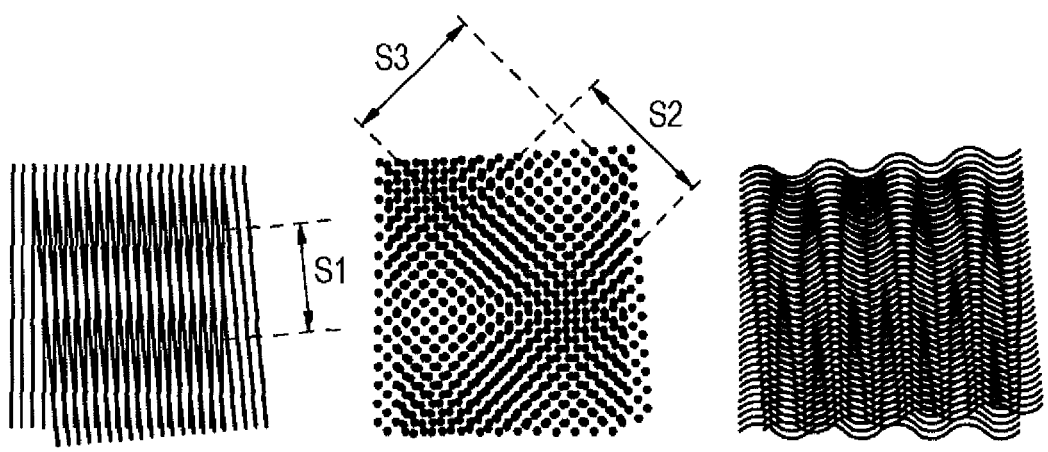
FIGS. 4a, 4b and 4c show different Moiré patterns.

FIG. 4 shows examples of Moiré patterns. FIG. 4*a* shows a pattern which has a periodicity of the step size S1 in one dimension (vertically in FIG. 4*a*). The dark bars are the points of intersection, which appear to be combined, of the lines of the individual line patterns 21, 22, with the one pattern easily being rotated with respect to the other pattern here in such a manner that the lines are not in parallel with one another. The periodicity of the Moiré pattern will be called a lattice constant in the following. It depends on the spacing of the lines and on the angle of rotation of the two line patterns 21, 22 with respect to one another. The lattice constant can be determined and set by means of these parameters.

FIG. 4*b* shows a two-dimensionally periodic Moiré pattern which is produced by the superposition of two dot patterns 21, 22. They can, for example, be constant dot patterns, wherein they can indeed have step sizes which are constant in the individual planes, but which are different from one another in a comparison of the planes. Two lattice constants S2 and S3, for example, one viewed from the bottom left to the top right and one viewed from the bottom right to the top left, can be defined here in accordance with the two area dimensions.

FIG. 4c finally shows an irregular Moiré pattern which can be produced by the superposition of individual patterns designed irregularly in a specific manner.

If Moiré effects should be produced, one of the optically effective patterns, for example the second one, can be applied and positioned in coordination with the first optically effective pattern. With regularly applied patterns, one or more axes can frequently be defined, for instance, main axes of imagined lattices at whose points of intersection pattern elements are arranged. Pattern orientations can then also be defined with reference to these axes. If first and second optically effective patterns each have such axes, these axes can be in parallel with one another or rotated with respect to one another by a specific angle, wherein the angle can be greater than 1° or greater than 2° or greater than 5° or greater than 10° and/or less than 20° or less than 10° or less than 5° or less than 4°.

The lattice constants of the spaced-apart patterns used for Moiré effects can be the same or can differ from one another, for instance, in one dimension or optionally in two dimensions by at least 0.5% or at least 1% or at least 2% or at least 5% and/or by at most 20% or at most 10% or at most 5% or at most 2%.

The design of the optically effective patterns in the two planes 23 and 24 can be such that a specific Moiré pattern is produced at a specific spacing from the pane. The parameters of the respective individual patterns 21, 22 can be selected in dependence on the desired Moiré pattern.

It may be desirable for easily perceptible Moiré patterns to be produced at a spacing from the pane at which the bird can still react during the approach. Said spacing can be 2 m or 4 m or 6 m perpendicularly remote from the pane. The Moiré pattern indirectly created by the design of the two patterns can then be such that it is regular at this spacing and has a one-dimensional or two-dimensional periodicity S1, S2, S3 of transparent and non-transparent (or less transparent) pane regions. The periodicity (lattice constant) of the Moiré pattern can then be over 2 cm or over 5 cm and/or below 30 cm or below 20 cm in one or both dimensions of the pane surface.

The patterns can also be designed such that the Moiré pattern produced appears aperiodic or irregular or quasi-random. The individual regions of permeable and impermeable or less permeable pane regions can then have average mean spacings of over 2 cm or over 5 cm or below 20 cm or below 15 cm.

The patterns applied to the respective panes or planes can also be designed such that regionally regular and regionally irregular Moiré patterns result.

The design of the individual optically effective patterns can also be such that specific effects which appear dynamic occur in that the Moiré patterns change when the viewing position changes. The design can, for example, be such that the lattice constant of the Moiré pattern becomes smaller on the approach, but still remains perceptible.

Since, as shown in FIG. 3, the two patterns 21, 22 have a spacing corresponding to the spacing D of the two pattern planes 23 and 24 from one another, the superposition effect of the two patterns is also dependent on the position or on the viewing angle and thereby also becomes dependent on movement. Movable Moiré patterns are produced in this manner in dependence on the movement of the bird in the proximity of the pane 20. The pattern is thereby particularly striking. The protective effect against bird strike is improved in this manner.

The degree of coverage of the absorbing pattern regions of a pattern on the total surface of the pane to which a pattern is applied can be over 1% of the area of the pane or over 2% or over 5% or over 10% or over 20% and/or can be below 50% or below 20% or below 10% or below 5% or below 2%.

It is pointed out again that the description just focused on intensity-absorbing pattern regions. Instead or in addition, the pattern regions can also be scattering and/or reflective. Instead of opaque regions, darker or more blurred or reflective regions can arise as patterns and cause the same static and dynamic effects.

Figure 5:
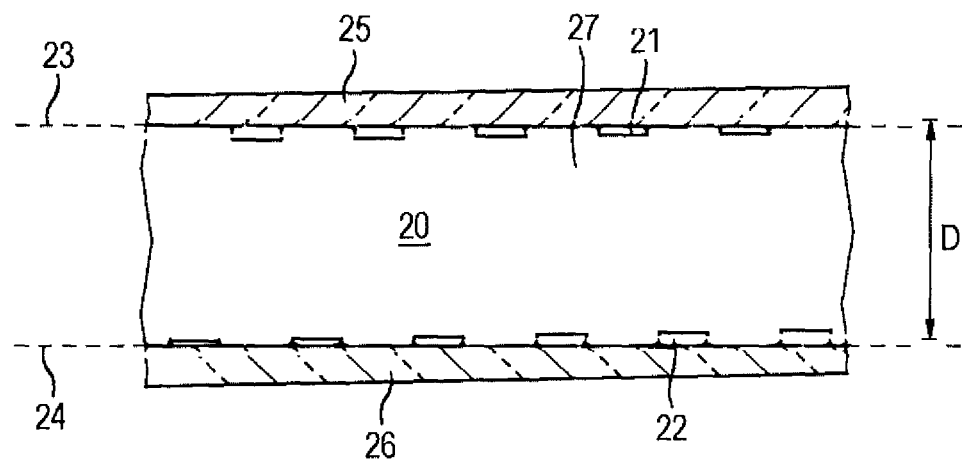
FIG. 5 shows a second embodiment.

FIG. 5 shows a double pane in which two single panes 25, 25 are provided at a spacing from one another and are also fixedly connected to one another in this manner. Together, they again form the transparent pane 20. The individual panes can have a constant spacing from one another. They can include a closed volume between them. The design can serve for thermal insulation (insulating glass). One each of the patterns 21, 22 can be disposed on one each of the individual panes 25, 26. The two pattern planes 23, 24 can, for example, be the mutually facing inner surfaces of the individual panes 25, 26 and can then respectively support the individual patterns 21, 22 again. The spacing D of the individual patterns is then the inner spacing of the individual panes 25, 26 which, as already stated, can be constant or, where possible, can also be variable. Effects of the same quality then result such as explained with respect to FIG. 3.

Figure 6:
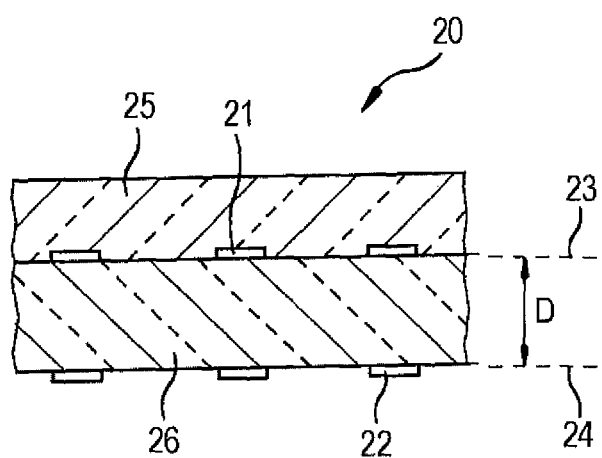
FIG. 6 shows a third embodiment.

FIG. 6 showed a composite glass pane in which two individual panes 25, 26 are attached directly to one another and on one another, that is without the intermediate space 27 of FIG. 5. In FIG. 6, the two pattern planes 23, 34 can be the surfaces of one of the individual panes; the two surfaces of the individual pane 26 are shown. The patterns can then be applied in a suitable manner here. However, one each pattern 21, 22 can also be disposed on one each surface of an individual pane 25, 26, with these surfaces preferably not contacting one another.

The individual pattern elements 21a, 21b, . . . , 22a, 22b . . . of the first pattern 21 and/or of the second pattern 22 can have dots and/or lines or strokes. The lines (1, 3 in FIG. 1) can, optionally, be or comprise straight lines or curved lines or angled lines which can be open or closed. Dots can be circular or oval (4, 2 in FIG. 1) or irregular (spots). A main dimension H can be defined for the dots or lines; it is the mean dot diameter (or mean diameter of circles of the same area) or the mean line width. The main dimension can be greater than 1 mm or greater than 2 mm or greater than 5 mm. It can be less than 50 mm or less than 20 mm or less than 10 mm.

With a sharp delineation of the pattern elements of different qualities with respect to one another, the transition region between them can be less than 10% or less than 5% or less than 2% of the main dimension of one of the mutually adjoining elements (in particular of the smaller element). However, it can also be greater than these mentioned values, but less than 30% or less than 20%.

One or both of the patterns 21, 22 can be formed by an applied material, with the material being able to have a metal or a metal oxide, for instance one or more metal nitrides and/or combinations of the mentioned metals or metal compounds, in particular $TiO_2$, $SnO_2$, $ZnO_2$, $SiO_2$, Ag, NiCr, AlN, $Si_3N_4$. The material can be combined/mixed with further materials, for instance, with a generally effective sun protection coating material, thermal insulation material. The pattern can, however, also be formed by pane treatment (engraving, laser engraving, etching with acids or lyes).

The pattern can generally be vaporized on or sputtered on or printed on or produced in a photolithographic manner or adhesively applied or applied by a combination of these methods.

Conceivable production methods are:
a) Producing the pattern elements by a partial removal of a coating previously applied over the full area, e.g. by laser processing, by applying a masking plus a subsequent etching process.
b) Applying a masking, then coating and removing the masking. The masking e.g. takes place by a screen printing process, a roller coating process, digital printing, etc.
c) Adhesively applying correspondingly effective films to one or more of the pane surfaces. A film can support the complete pattern, can be formed over the full area and can be adhesively applied in such a manner. However, it is also conceivable that the film only forms regions of a quality (absorbing and/or reflective and/or scattering) and is thus only partially applied to the surface.

As far as is sensible and is possible by manufacturing processes, the spacing of different patterns from one another in the thickness direction of the pane can also be produced in that pattern parts are formed in the interior of the pane and are then not disposed on a surface of the pane. This can take place by a deep-acting processing method, for instance, ion implantation, laser focusing or similar.

The pane material can generally be a comparatively transparent material, that is in particular glass, quartz glass, window glass, vehicle glazing, noise barrier glazing, security glass, insulating glass, composite glass, wired glass, dual-layer glass, triple-layer glass and multi-layer glass. The transparent material can also be a low-absorbing plastic (in particular thermoplastic, thermosetting plastic), for instance, acrylic glass. The pane material can be planar or curved.

In addition to the processing for bird strike protection as described above, the pane can have processing for thermal insulation and/or for sun protection, for instance, a coating of one or more surfaces, a filling of a closed intermediate space between two panes or similar. The pane regions of the first quality can in particular already be more absorbing/reflective/scattering than described above, for example, up to 10% or up to 20% or up to 30% of the intensity in the visible part of the spectrum and the regions of the second quality are even more absorbing/reflective/scattering in comparison, for example, more absorbing/reflective/scattering by at least 10% or at least 20% of the observed intensity.

The invention claimed is:

1. A transparent window pane comprising a first optically effective pattern of first pattern elements in a first plane and a second optically effective pattern of second pattern elements in a second plane, spaced apart from the first plane in the thickness direction of the transparent window pane, wherein the first and second pattern elements are arranged in superposition with one another to collectively cause Moiré patterns in a UV spectrum range between a wavelength of about 50 nm and 380 nm and transparent in a spectrum range between a wavelength of about 380 nm and 800 nm, the Moiré pattern produced is one-dimensionally or two dimensionally irregular, and viewed in one direction, has a mean spacing between maxima and adjacent minima that comprises above 2 cm and below 20 cm, wherein the first pattern elements have transmission properties and/or absorption properties and/or reflection properties and/or scattering properties that are different from the second pattern elements, wherein the first pattern elements have a degree of absorption and/or a degree of reflection of at least 30% of the radiation power at a wavelength in a wavelength range between 100 nm and 400 nm.

2. The transparent window pane in accordance with claim 1, wherein the first pattern elements are transparent in a range of a spectrum visible to humans, namely, between a wavelength of about 380 nm and 800 nm, and have a degree of absorption and/or a degree of reflection of at least 50% of the radiation power in the wavelength range between 100 nm and 400 nm.

\* \* \* \* \*